(12) United States Patent
Ku et al.

(10) Patent No.: US 9,191,264 B2
(45) Date of Patent: *Nov. 17, 2015

(54) METHOD AND APPARATUS FOR INITIATING COMMUNICATION SESSIONS

(71) Applicant: AT&T Intellectual Property I, LP, Atlanta, GA (US)

(72) Inventors: Bernard Ku, Austin, TX (US); Armstrong Soo, San Ramon, CA (US); Lakshminarashimhan Naidu, Pearland, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/048,135

(22) Filed: Oct. 8, 2013

(65) Prior Publication Data

US 2015/0098462 A1  Apr. 9, 2015

(51) Int. Cl.
*H04L 12/66* (2006.01)
*H04L 29/06* (2006.01)

(52) U.S. Cl.
CPC ................... *H04L 29/06176* (2013.01)

(58) Field of Classification Search
None
See application file for complete search history.

(56) References Cited

U.S. PATENT DOCUMENTS

| | | |
|---|---|---|
| 2004/0156394 A1 | 8/2004 | Westman |
| 2004/0243596 A1 | 12/2004 | Lillqvist et al. |
| 2005/0182781 A1 | 8/2005 | Bouvet |
| 2008/0247381 A1* | 10/2008 | Bohm et al. .................. 370/352 |
| 2009/0161666 A1* | 6/2009 | Ku ................................ 370/356 |
| 2010/0153563 A1* | 6/2010 | Ku ................................ 709/228 |
| 2012/0106324 A1 | 5/2012 | Keller et al. |
| 2013/0163586 A1 | 6/2013 | Ku |

OTHER PUBLICATIONS

"NAPTR Record Manipulation", http://meetings.ripe.net/ripe-47/presentations/ripe47-enum-naptr.pdf, 2002-2004.

* cited by examiner

*Primary Examiner* — Frank Duong
(74) *Attorney, Agent, or Firm* — Guntin & Gust, PLC; Joseph Hrutka (57) ABSTRACT

An aspect of the subject disclosure may include, for example, receiving a request from a communication device to initiate a communication session in a packet-switched network, obtaining a first name authority pointer record responsive to determining that there is an undesirable operational state in the packet-switched network, wherein the first name authority pointer record comprises a commented out record, obtaining a second name authority pointer record responsive to determining that there is a desirable operation state in the packet-switched network, wherein the second name authority pointer record comprises a record, and initiating the communication session according to one of the first name authority pointer record or the second name authority pointer record. Other embodiments are disclosed.

19 Claims, 6 Drawing Sheets

100
FIG. 1

FIG. 2
VoLTE Request Processed as VoLTE Session

METHOD AND APPARATUS FOR INITIATING COMMUNICATION SESSIONS

FIELD OF THE DISCLOSURE

The subject disclosure relates to a method and apparatus for initiating communication sessions.

BACKGROUND

Services provider continue to upgrade their networks from providing circuit-switched voice communications to packet-switched voice communications. Many service providers have upgraded landline networks to support voice over Internet protocol (VoIP). Similarly, it is expected service providers of wireless communication systems will upgrade their networks to support voice over long term evolution (VoLTE) communications from current second generation (2G) and third generation (3G) wireless voice communications.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for mitigating faults in a VoLTE network. Other embodiments are included in the subject disclosure.

One embodiment of the subject disclosure includes a method for receiving a request from a communication device to initiate a communication session, obtaining a first name authority pointer record comprising a commented out record responsive to determining that there is an undesirable fault level in a voice over long term evolution network, where the commented out record causes a network element processing the record to initiate the communication session utilizing a circuit-switched communication network, obtaining a second name authority pointer record responsive to determining that there is no fault or a tolerable level of faults in the voice over long term evolution network, where the second name authority pointer record comprises a record for initiating the communication session utilizing a voice over long term evolution network, and initiating the communication session according to one of the first name authority pointer record or the second name authority pointer record.

One embodiment of the subject disclosure includes a machine-readable storage medium including executable instructions, which when executed by a processor, cause the processor to perform operations including receiving a request from a communication device to initiate a communication session, obtaining a first name authority pointer record comprising a commented out record responsive to determining that there is an undesirable malfunction in a packet-switched network, wherein the commented out record causes a network element processing the record to initiate the communication session utilizing a circuit-switched communication network, obtaining the second name authority pointer record responsive to determining that there is no malfunction or a tolerable level of malfunctions in the packet-switched network, wherein the second name authority pointer record comprises a record for initiating the communication session utilizing the packet-switched network, and initiating the communication session according to one of the first name authority pointer record or the second name authority pointer record obtained by the processor.

One embodiment of the subject disclosure includes a device including a memory to store executable instructions, and a processor coupled to the memory. Execution of the executable instructions can cause the processor to perform operations including receiving a request from a communication device to initiate a communication session in a packet-switched network, obtaining a first name authority pointer record responsive to determining that there is an undesirable operational state in the packet-switched network, wherein the first name authority pointer record comprises a commented out record, obtaining a second name authority pointer record responsive to determining that there is a desirable operation state in the packet-switched network, wherein the second name authority pointer record comprises a record, and initiating the communication session according to one of the first name authority pointer record or the second name authority pointer record obtained by the processor.

Figure 1:
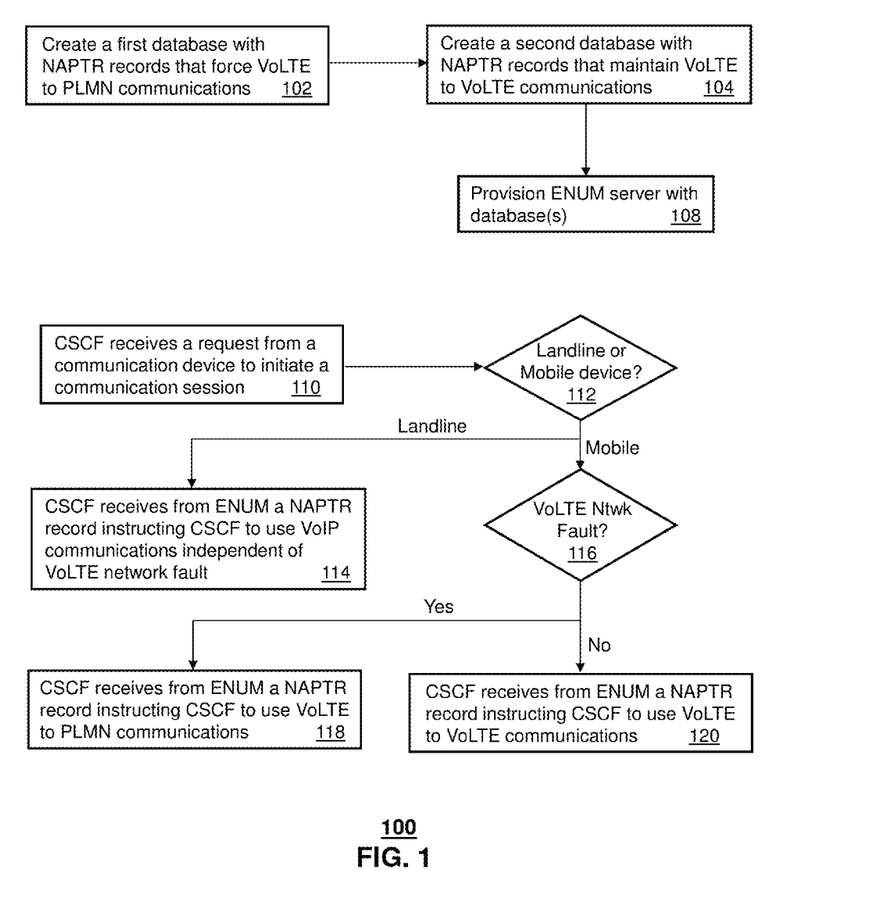
FIG. 1 depicts an illustrative embodiment of a method for processing communication requests.

FIG. 1 depicts an illustrative embodiment of a method 100 for processing communication requests in a communication system that supports both Voice over Long Term Evolution (VoLTE) communications and Public Line Mobile Network (PLMN) or 2/3G wireless communications. In one embodiment, method 100 can begin with step 102 in which a first database storing name authority pointer records (herein referred to as NAPTR records) is created to force a VoLTE communication request to result in a PLMN communication session. At step 104 a second database of NAPTR records is created, whereby such NAPTR records result in VoLTE communication requests being processed as VoLTE communication sessions.

A tElephone NUmber Mapping (ENUM) server can be instructed to use the first database when a VoLTE network experiences a communication fault. The extent of the communication fault can be partial (e.g., a metropolitan area, a cluster of routers, an intermittent interruption in communications by a network node, etc.) or a catastrophic fault (e.g., network faults across a state or geographic regions). The ENUM server can be instructed to use the second database when the VoLTE network is not experiencing faults or if faults are present, the degree or volume of network elements experiencing a fault is considered tolerable. A fault can represent any undesirable characteristics in a VoLTE network such as a malfunctioning network node, excess packet losses at a network node, a network node that has been compromised by an unauthorized third party, clusters of malfunctioning network nodes, and so on. A network node can represent a network communication device used for facilitating end to end communications for end user equipment.

In one embodiment, the first database, which can represent an "outage" ENUM database to force a VoLTE communication request to be processed as a PLMN communication session via 2G/3G circuit switch networks instead of 4G/LTE networks, can store NAPTR records that have commented out record entries by using a semicolon (;) or other means for commenting out record entries such as shown below.

```
;$ORIGIN 1.1.1.1.2.2.2.2.1.5.1.e164.arpa.
;IN NAPTR 100 20 "u" "E2U+sip"  "!^.*$!sip:+15122221111@one.domain.net;user=phone!".
```

A commented out NAPTR record such as the one above can serve as a default instruction to a network node to use a circuit-switched 2G/3G network (e.g., PLMN) instead of a 4G/LTE network.

The second database, which can represent a "normal operations" ENUM database, can store NAPTR records such as the one below so that VoLTE communication requests are processed as VoLTE communication sessions:

```
$ORIGIN 1.1.1.1.2.2.2.2.1.5.1.e164.arpa.
IN NAPTR 100 20 "u" "E2U+sip"   "!^.*$!sip:+15122221111@one.domain.net;user=phone!".
```

NAPTR records for outage conditions and normal conditions, respectively, can also be created in the first and second databases for new VoLTE subscriber devices as shown above. A benefit of a dual database approach such as described above is that it minimizes time to transition between a normal operating state of the VoLTE network to an outage condition, and vice-versa.

In another embodiment, a single database, can be configured with the VoLTE NAPTR records with the ENUM service field "E2U+sip" when VoLTE network conditions have an acceptable level of faults or no faults at all. Under these conditions, the single database operates as an ENUM database operating under "normal" conditions. When fault conditions exceed a desired operating condition, the "normal" ENUM database can be reconfigured to comment out all entries for NAPTR records of VoLTE communication devices using a semicolon as shown above or other suitable commenting techniques. Under these conditions, the single database operates as an ENUM database operating under "outage" conditions. When operating conditions return to acceptable levels, the "outage" ENUM database can be reconfigured to restore all entries for the NAPTR records of the VoLTE communication devices by removing the commenting out string (;). For a new VoLTE subscriber device, the ENUM database can utilize NAPTR records with commented out entries when a VoLTE network outage condition is present, or a VoLTE NAPTR record with service fields "E2U+sip" and "$!sip:" when the VoLTE network is operating under desirable conditions.

With these embodiments in mind, the ENUM server can be provisioned at step 108 according to a dual database of NAPTR records as described in steps 102-104 that are selected by the ENUM server according to a state of the VoLTE network, or a single database of NAPTR records that are edited by each ENUM server in the network or a central system running a script to update network ENUM servers according to a state of the VoLTE network.

In one embodiment, the foregoing NAPTR record strategies can be applied only to communication devices capable of VoLTE communications. For Voice over Internet Protocol (VoIP) communication requests, NAPTR records can be kept unchanged regardless of network conditions. Accordingly, independent of the state of a VoLTE network, NAPTR records of VoIP communication devices such as shown below, will not be changed in an ENUM database.

```
$ORIGIN 1.1.1.1.2.2.2.2.1.5.1.e164.arpa.
IN NAPTR 100 10 "u" "E2U+sip"   "!^.*$!sip:+15122221111@one.domain.net;user=phone!".
```

Once the ENUM server is provisioned with one or more databases as described above, method 100 can be put into practice for processing communication requests initiated by communication devices. Method 100 can continue, for example, at step 110 where a CSCF receives a communication request from a communication device to initiate a communication session. At step 112, the CSCF can initiate an ENUM query with an ENUM server to process the communication request. The ENUM server can determine at step 112 from the query the identity of the communication device by way of an E.164 number or SIP URI. The identity can then be used to determine if the communication is a landline device configured for VoIP communications or a mobile device configured for VoLTE communications. If the device is determined to be a landline device, then the ENUM server provides to the CSCF at step 114 a NAPTR record instructing the CSCF to initiate a VoIP communication session independent of the state the VoLTE network.

If the communication device, however, is a VoLTE-capable communication device, and the request is for initiating a communication session using the VoLTE network, then the ENUM server proceeds to step 116 to determine if the VoLTE network is experiencing a fault that is deemed undesirable. As noted earlier the fault can be a partial or substantial fault. The threshold, and parameters measured by service provider equipment to determine when a fault in the VoLTE network is undesirable can be defined by the service provider according to the service provider's operational objectives. If there is no fault, or a tolerable level of faults, the ENUM server will provide in step 120 a NAPTR record (such as the embodiments previously described) that instructs the CSCF to initiate a communication session utilizing the VoLTE network. If, however, an undesirable fault is detected, the ENUM server can provide the CSCF at step 118 a NAPTR record that instructs the CSCF to use a PLMN network to initiate a circuit-switched communication session.

As noted earlier, in one embodiment the ENUM server can select between NAPTR databases to choose a NAPTR record that achieves the objectives of step 118 or step 120. Alternatively, the ENUM server (or a remote server) can edit NAPTR record entries in a single database depending on the state of the VoLTE network. As noted above, if the VoLTE network experiences an undesirable fault, the NAPTR record entries can be commented out with for example preceding semicolons (;). Once the VoLTE network is operating in a desirable state, the semicolons can be removed to restore VoLTE NAPTR record entries. The ENUM server can thus provide from a single database NAPTR records with commented out entries at step 118 or VoLTE NAPTR records at step 120 depending on the state of the VoLTE network.

Figure 2:
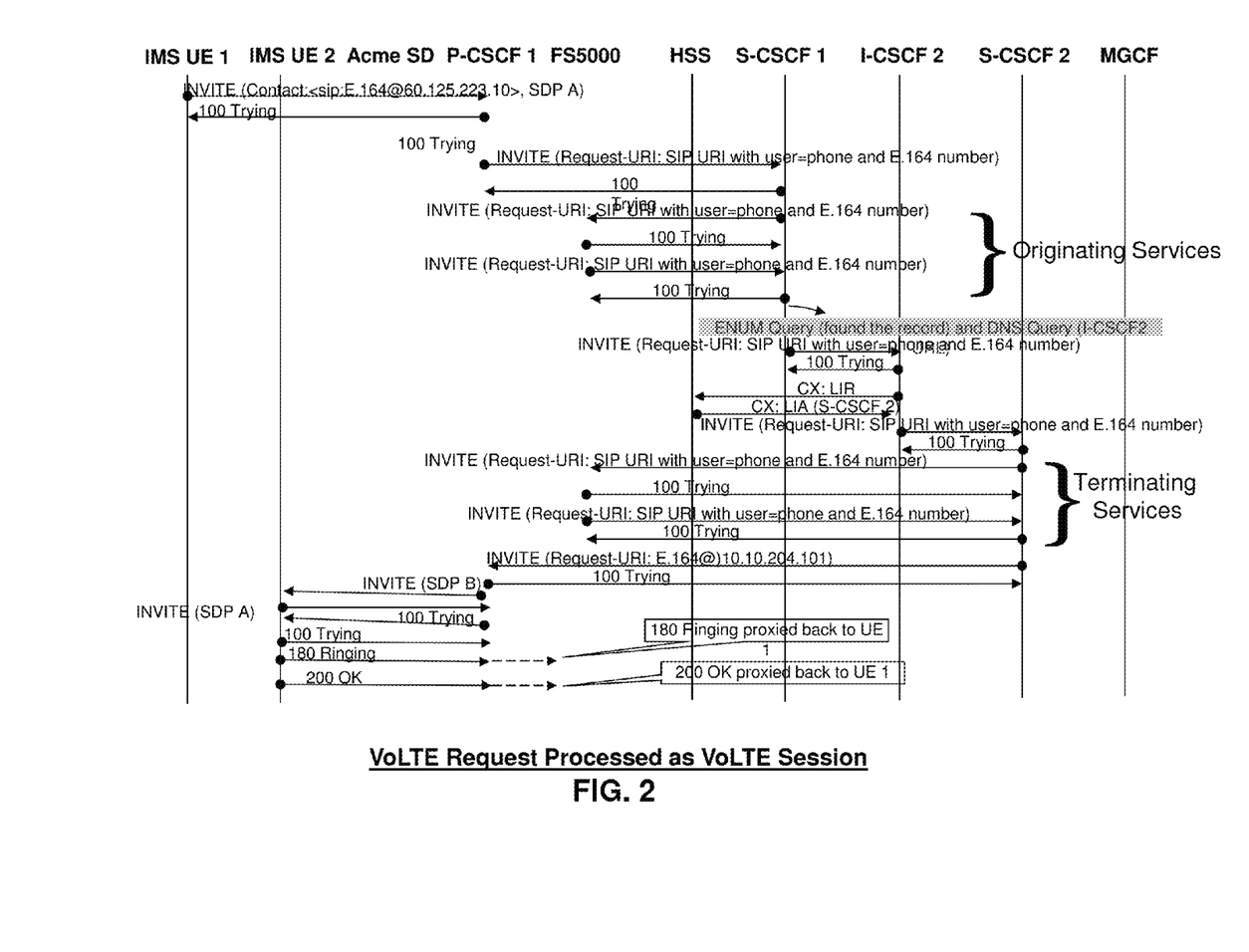
FIG. 2 depicts an illustrative embodiment of a flow diagram for initiating a Voice over Long Term Evolution (VoLTE) communication session when the VoLTE network is not subject to an undesirable fault level in accordance with the method of FIG. 1.
Figure 3:
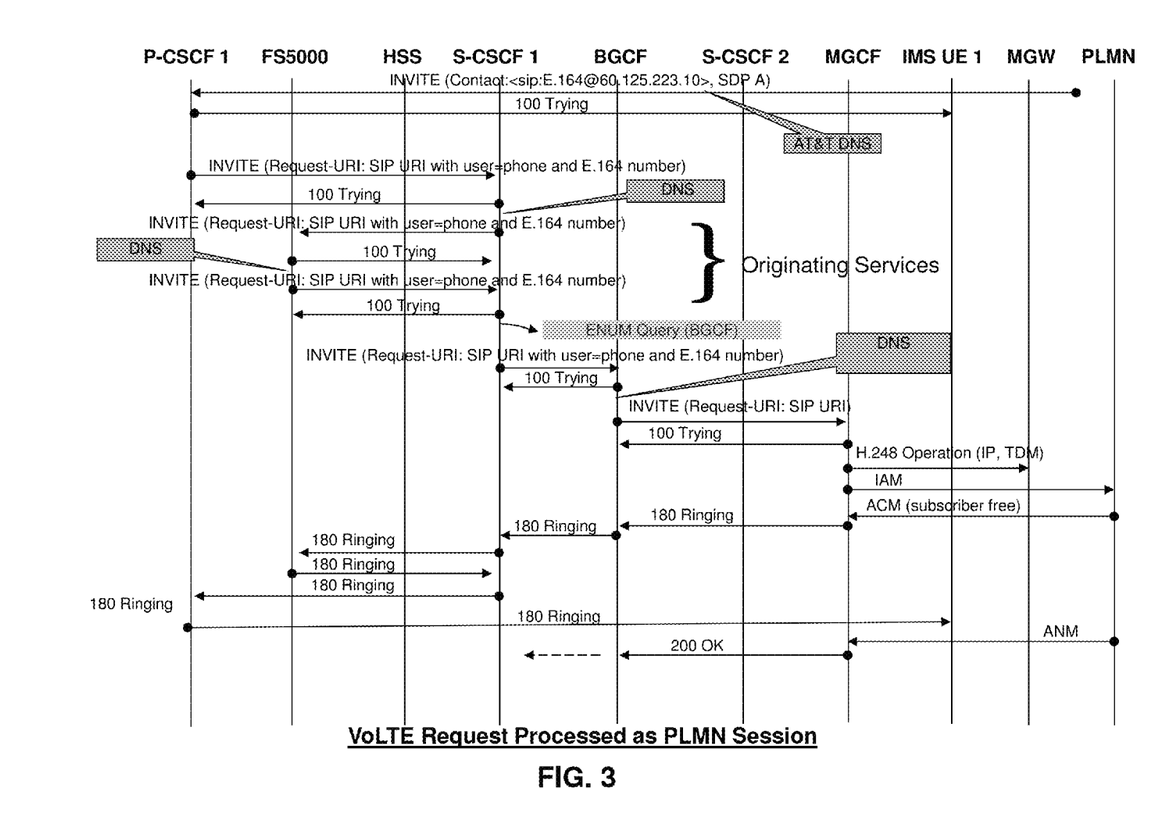
FIG. 3 depicts an illustrative embodiment of a flow diagram for initiating a Public Line Mobile Network (PLMN) for a 2G or a 3 G communication session when the VoLTE network is experiencing an undesirable fault level in accordance with the method of FIG. 1.

Step 120 can be described by the flow diagram of FIG. 2, which depicts a CSCF initiating a VoLTE communication session based on the NAPTR record provided by the ENUM server at step 120 when the VoLTE network is not subject to an undesirable fault. Step 118 can be described by the flow diagram of FIG. 3, which depicts the CSCF initiating a PLMN communication session based on the NAPTR record provided by the ENUM server at step 118 when the VoLTE network is experiencing an undesirable fault.

Figure 4:
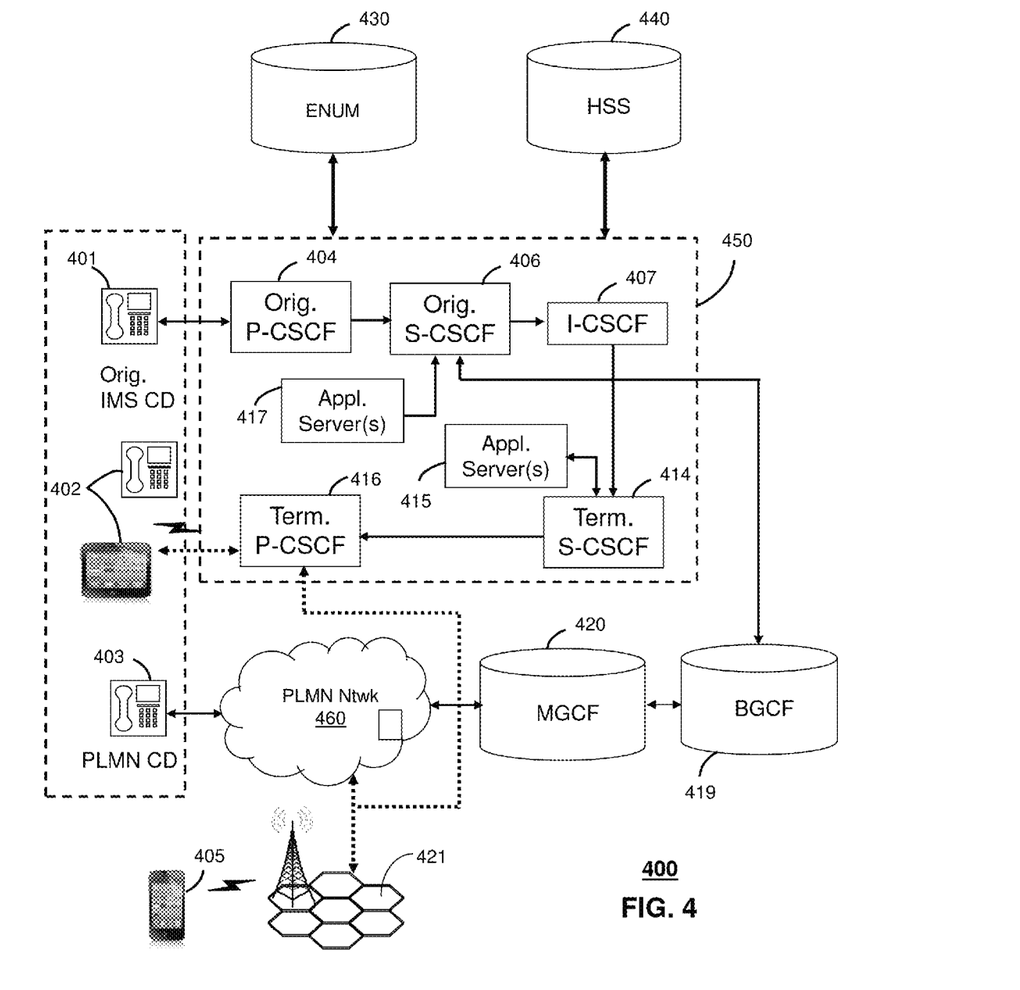
FIG. 4 depicts illustrative embodiment of a communication system that operates according to the method of FIG. 1.

FIG. 4 depicts an illustrative embodiment of a communication system 400 employing an IMS network architecture to facilitate the combined services of circuit-switched and packet-switched systems. The ENUM server, CSCF servers, HSS and other network nodes of the IMS network 450 described below can be configured to operate as described above in relation to method 100 of FIG. 1.

Communication system 400 can comprise a Home Subscriber Server (HSS) 440, an ENUM server 430, and other network elements of an IMS network 450. The IMS network 450 can establish communications between IMS-compliant communication devices (CDs) 401, 402, PLMN CDs 403, 405, and combinations thereof by way of a Media Gateway Control Function (MGCF) 420 coupled to a PLMN network 460. The MGCF 420 need not be used when a communication session involves IMS CD to IMS CD communications. A communication session involving at least one PLMN CD may utilize the MGCF 420.

IMS CDs 401, 402 can register with the IMS network 450 by contacting a Proxy CSCF (P-CSCF) which communicates with an interrogating CSCF (I-CSCF), which, in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 400 of FIG. 4.

If the terminating communication device is instead a PLMN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PLMN CD over the PLMN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
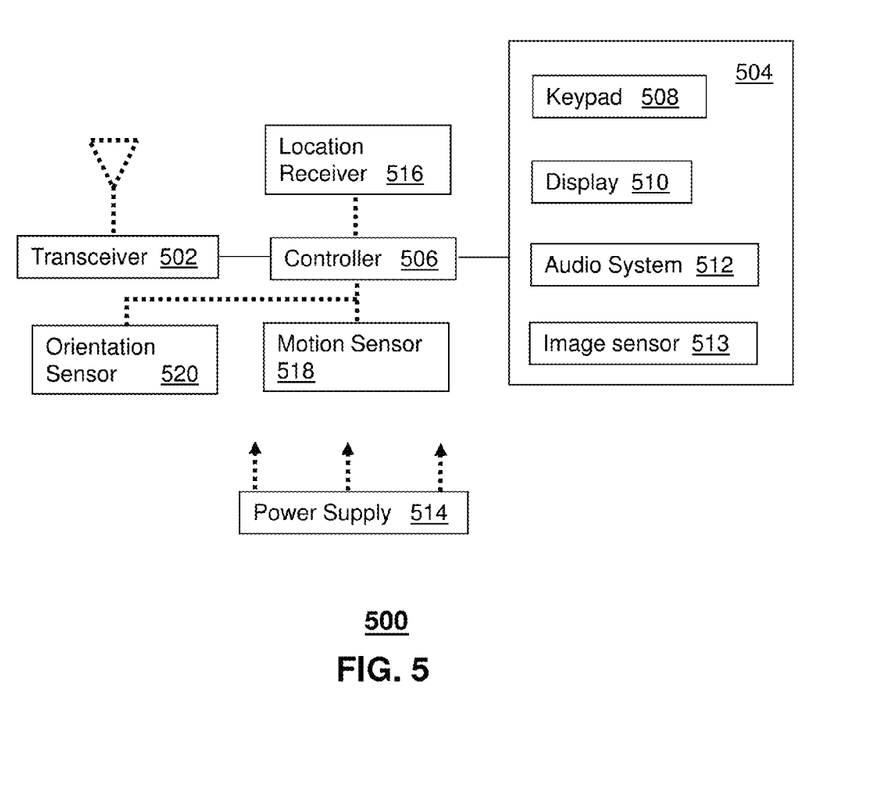
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIG. 4. The communication device 500 described below can embodiment any device described above, and when applicable can be configured in whole or in part to operate as described above in relation to method 100 of FIG. 1.

With this in mind, communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PLMN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
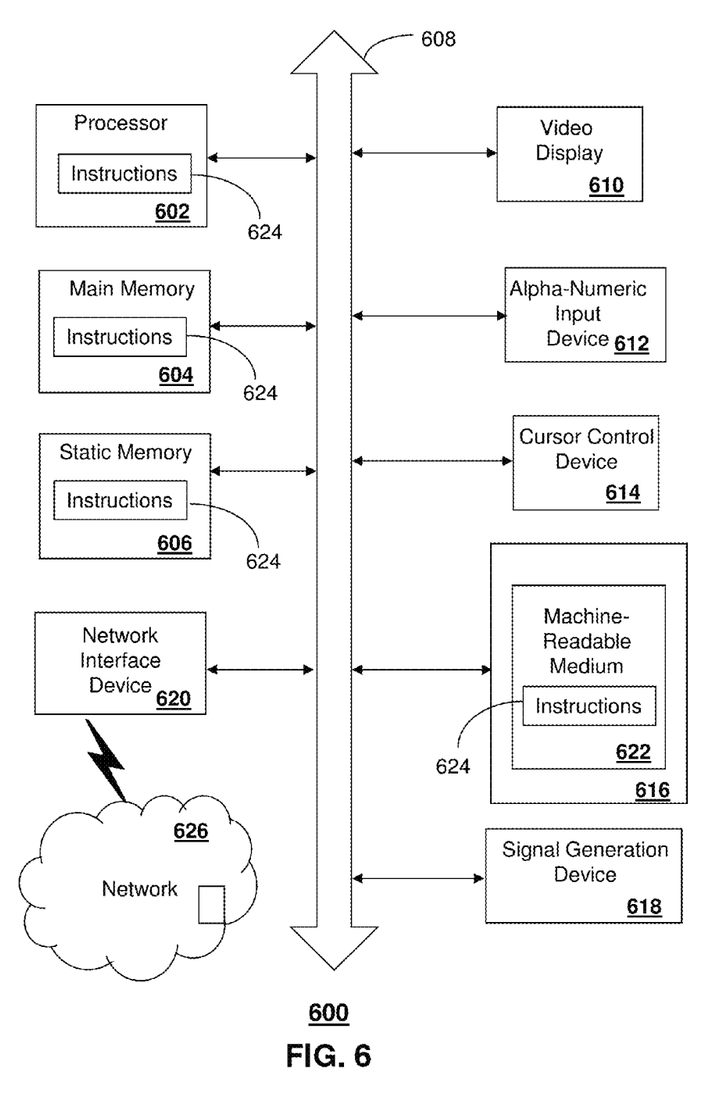
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. In some embodiments, the machine may be connected (e.g., using a network 626) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile)

memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    receiving, by a system comprising a processor, a request from a communication device to initiate a communication session;
    obtaining, by the system, a first name authority pointer record comprising a commented out record responsive to determining that there is an undesirable fault level in a voice over long term evolution network, wherein the commented out record causes a network element processing the record to initiate the communication session utilizing a circuit-switched communication network;
    obtaining, by the system, a second name authority pointer record responsive to determining that there is no fault or a tolerable level of faults in the voice over long term evolution network, wherein the second name authority pointer record comprises a record for initiating the communication session utilizing the voice over long term evolution network,
        wherein the obtaining of the first name authority pointer record comprises creating the first name authority pointer record from the second name authority record by deleting the record in the second name authority record thereby generating the first name authority pointer record with the commented out record responsive to determining that there is the undesirable fault level in the voice over long term evolution network, and
        wherein the obtaining of the second name authority pointer record comprises restoring the second name authority pointer record from the first name authority record by adding the record in the first name authority record thereby generating the second name authority pointer record with the record responsive to determining that there is no fault or a tolerable level of faults in the voice over long term evolution network; and
    initiating, by the system, the communication session according to one of the first name authority pointer record or the second name authority pointer record obtained by the system.

2. The method of claim 1, further comprising determining whether the communication device is configured for voice over internet protocol communications or configured for voice over long term evolution communications, wherein obtaining the first name authority pointer record is further responsive to determining that the communication device is configured for voice over long term evolution communications.

3. The method of claim 2, further comprising obtaining a third name authority pointer record comprising instructions for initiating the communication session utilizing a voice over internet protocol responsive to determining that the communication device is configured for voice over internet protocol communications regardless of whether there is the undesirable fault level in the voice over long term evolution network.

4. The method of claim 1, wherein the system comprises a call session control function device.

5. The method of claim 1, wherein the first name authority pointer record is stored in a first database.

6. The method of claim 5, wherein the first database is an outage database.

7. The method of claim 5, further comprising utilizing, by the system, the first database to process requests from communication devices when there is the undesirable fault level in the voice over long term evolution network.

8. The method of claim 1, wherein the second name authority pointer record is stored in a second database used for normal operations.

9. The method of claim 8, further comprising utilizing, by the system, the second database to process the requests from the communication devices when there is no fault or the tolerable level of faults in the voice over long term evolution network.

10. The method of claim 1, wherein the undesirable fault level in the voice over long term evolution network comprises a malfunction in a network element of the voice over long term evolution network, and wherein the communication device comprises a mobile communication device.

11. A non-transitory, machine-readable storage medium comprising executable instructions, which when executed by a processor, cause the processor to perform operations comprising:
receiving a request from a communication device to initiate a communication session;
obtaining a first name authority pointer record comprising a commented out record responsive to determining that there is an undesirable malfunction in a packet-switched network, wherein the commented out record causes a network element processing the record to initiate the communication session utilizing a circuit-switched communication network;
obtaining a second name authority pointer record responsive to determining that there is no malfunction or a tolerable level of malfunctions in the packet-switched network, wherein the second name authority pointer record comprises a record for initiating the communication session utilizing the packet-switched network,
wherein the obtaining the first name authority pointer comprises creating the first name authority pointer record from the second name authority record by deleting the record in the second name authority record thereby generating the first name authority pointer record with the commented out record responsive to determining that there is the undesirable malfunction in the packet-switched network; and
wherein the obtaining the second name authority pointer comprises restoring the second name authority pointer record from the first name authority record by add the record in the first name authority record thereby generating the second name authority pointer record with the record responsive to determining that there is no malfunction or a tolerable malfunction in the packet-switched network; and
initiating the communication session according to one of the first name authority pointer record or the second name authority pointer record obtained by the processor.

12. The non-transitory, machine-readable storage medium of claim 11, wherein the communication device comprises a portable communication device.

13. The non-transitory, machine-readable storage medium of claim 11, wherein the operations further comprise storing the first name authority pointer record in a first database and storing the second name authority pointer record in a second database.

14. The non-transitory, machine-readable storage medium of claim 13, wherein the operations further comprise:
utilizing the first database when the packet-switched network has the undesirable malfunction; and
utilizing the second database when the packet-switched network has no malfunction or the tolerable level of malfunctions.

15. The non-transitory, machine-readable storage medium of claim 11, wherein the packet-switched network comprises a voice over long term evolution network.

16. The non-transitory, machine-readable storage medium of claim 11, wherein the undesirable malfunction in the packet-switched network comprises a malfunction in a network element of the packet-switched network.

17. A device, comprising:
a memory to store executable instructions; and
a processor coupled to the memory, wherein execution of the executable instructions causes the processor to perform operations comprising:
receiving a request from a communication device to initiate a communication session in a packet-switched network;
obtaining a first name authority pointer record responsive to determining that there is an undesirable operational state in the packet-switched network, wherein the first name authority pointer record comprises a commented out record;
obtaining a second name authority pointer record responsive to determining that there is a desirable operation state in the packet-switched network, wherein the second name authority pointer record comprises a record, wherein the obtaining the first name authority pointer comprises creating the first name authority pointer record from the second name authority record by deleting the record in the second name authority record thereby generating the first name authority pointer record with the commented out record responsive to determining that there is the undesirable operational state in the packet-switched network, and wherein the obtaining the second name authority pointer comprises restoring the second name authority pointer record from the first name authority record by add the record in the first name authority record thereby generating the second name authority pointer record with the record responsive to determining that there is the desirable operation state or an acceptable undesirable operational state in the packet-switched network; and
initiating the communication session according to one of the first name authority pointer record or the second name authority pointer record obtained by the processor.

18. The device of claim 17, wherein the operations further comprise storing the first name authority pointer record in a first database and storing the second name authority pointer record in a second database.

19. The device of claim 18, wherein the operations further comprise:
utilizing the first database when the packet-switched network has the undesirable operational state; and
utilizing the second database when the packet-switched network has the desirable operation state.

* * * * *